United States Patent
Bajpay et al.

(10) Patent No.: US 7,881,189 B1
(45) Date of Patent: Feb. 1, 2011

(54) METHOD FOR PROVIDING PREDICTIVE MAINTENANCE USING VOIP POST DIAL DELAY INFORMATION

(75) Inventors: Paritosh Bajpay, Edison, NJ (US); Hossein Eslambolchi, Los Altos Hills, CA (US); John McCanuel, Bailey, CO (US); Moshiur Rahman, Marlboro, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 307 days.

(21) Appl. No.: 11/321,086

(22) Filed: Dec. 30, 2005

(51) Int. Cl.
*H04J 3/14* (2006.01)

(52) U.S. Cl. .................. 370/218; 370/217; 370/225; 370/230; 370/242; 370/252; 379/9.03; 379/9.04; 379/14.01; 379/15.05; 379/27.03; 709/224; 709/226

(58) Field of Classification Search ............... 379/1.03, 379/9.03, 9.04, 14.01, 13, 15.05, 27.02, 27.03, 379/27.04, 32.01–33; 370/216–220, 225–230, 370/242–252; 375/213; 709/223–226
See application file for complete search history.

(56) References Cited

U.S. PATENT DOCUMENTS

| | | | |
|---|---|---|---|
| 4,959,849 A * | 9/1990 | Bhusri | 379/32.01 |
| 6,778,496 B1 * | 8/2004 | Meempat et al. | 370/230 |
| 6,993,013 B1 * | 1/2006 | Boyd | 370/352 |
| 7,245,609 B2 * | 7/2007 | D'Eletto | 370/352 |
| 2004/0013090 A1 * | 1/2004 | Cashiola et al. | 370/238 |

* cited by examiner

*Primary Examiner*—Hemant Patel

(57) ABSTRACT

Predictive maintenance in a communications environment can be triggered when an anomaly in the call set-up process is detected. In one arrangement, in a VoIP context, the post dial delay (PDD) associated with call set up is monitored. If a link or node has an abnormally high contribution to the PDD it may be designated for predictive maintenance.

12 Claims, 3 Drawing Sheets

METHOD FOR PROVIDING PREDICTIVE MAINTENANCE USING VOIP POST DIAL DELAY INFORMATION

BACKGROUND

The invention relates generally to a communication system, and more particularly to a system in which the quality of service of a voice over IP (VoIP) arrangement is monitored.

Telecommunication service provision is in a state of evolution. For many, many years, telecommunications services such as telephony were provided over what is commonly referred to as the public switched telephone network or PSTN. With the advent of the Internet, attention was directed to providing telephony services and enhanced telephony services utilizing the networking capabilities of the Internet. This has given rise to what is commonly referred to as voice over Internet protocol or VoIP services.

A critical aspect of any VoIP services offering relates to the quality of service associated with that offering. Users of telephony services have grown accustomed to high quality communications where calls are set up transparently to the origin point and the destination point with rarely any service issues arising either in the call set up process or during the course of the communication itself. Because of the nature of communication over the Internet, there is the possibility that service issues may become more pronounced and perceptible by end user customers. This is particularly of concern in a business environment where quality of service, reliability and dependability are critical for the business entity to be confident that it will have the communication services that it needs to effect its own business transactions.

It would therefore be beneficial to provide a capability of providing predictive maintenance with regard to aspects of the VoIP services configuration.

SUMMARY

To provide better predictive maintenance for a VoIP configuration, a method monitors a metric associated with call set-up operations in the communications arrangement. One such metric is the time it takes from call initiation to call set up completion. An arrangement monitors the call set-up process for a call across all links and nodes involved in the set up. In so doing the monitoring operation can detect when a call set-up exceeds a desirable threshold. This detected state then forms the basis for determining whether certain maintenance ought to be performed in advance of a possible future failure.

DETAILED DESCRIPTION

In an arrangement in accordance with an embodiment of the invention, a monitoring system detects metrics related to the call set-up process in the VoIP network. A monitoring system can detect various metrics associated with the call set-up process and determine whether or not any one of the measured metrics for a particular call set-up option is indicative of an anomaly which should be addressed by way of some predictive maintenance. For purposes of describing an example of how such a monitoring processor might operate, the metric selected for our example is a post-dial delay.

When a telephone unit begins the process of trying to establish communication through the VoIP network, a call set-up operation has begun. The time delay from the dial operation all the way through the completion of a call set-up is typically referred to as the post-dial delay (PDD). Typically in the signaling systems utilized for VoIP communications (session initiation protocol (SIP) and communications under the H.323 standard), there are detections of and presentations of information about the post-dial delay associated with a given call and with given elements utilized to establish a call, for instance, links and/or nodes which constitute the elements utilized in a call that has been set up.

In accordance with an embodiment of the invention, a monitoring process receives this quality of service measurement data and determines if and when a post-dial delay contribution by a given link or node is an indication of a partial failure or hidden problem within the network. If such a partial failure or a hidden problem is detected in this manner, then the problem can be caught at an early state utilizing a trap message or alarm that would notify a network performance manager and a service maintenance operation so as to address the potential problem before it becomes a potential catastrophic failure.

Figure 1:
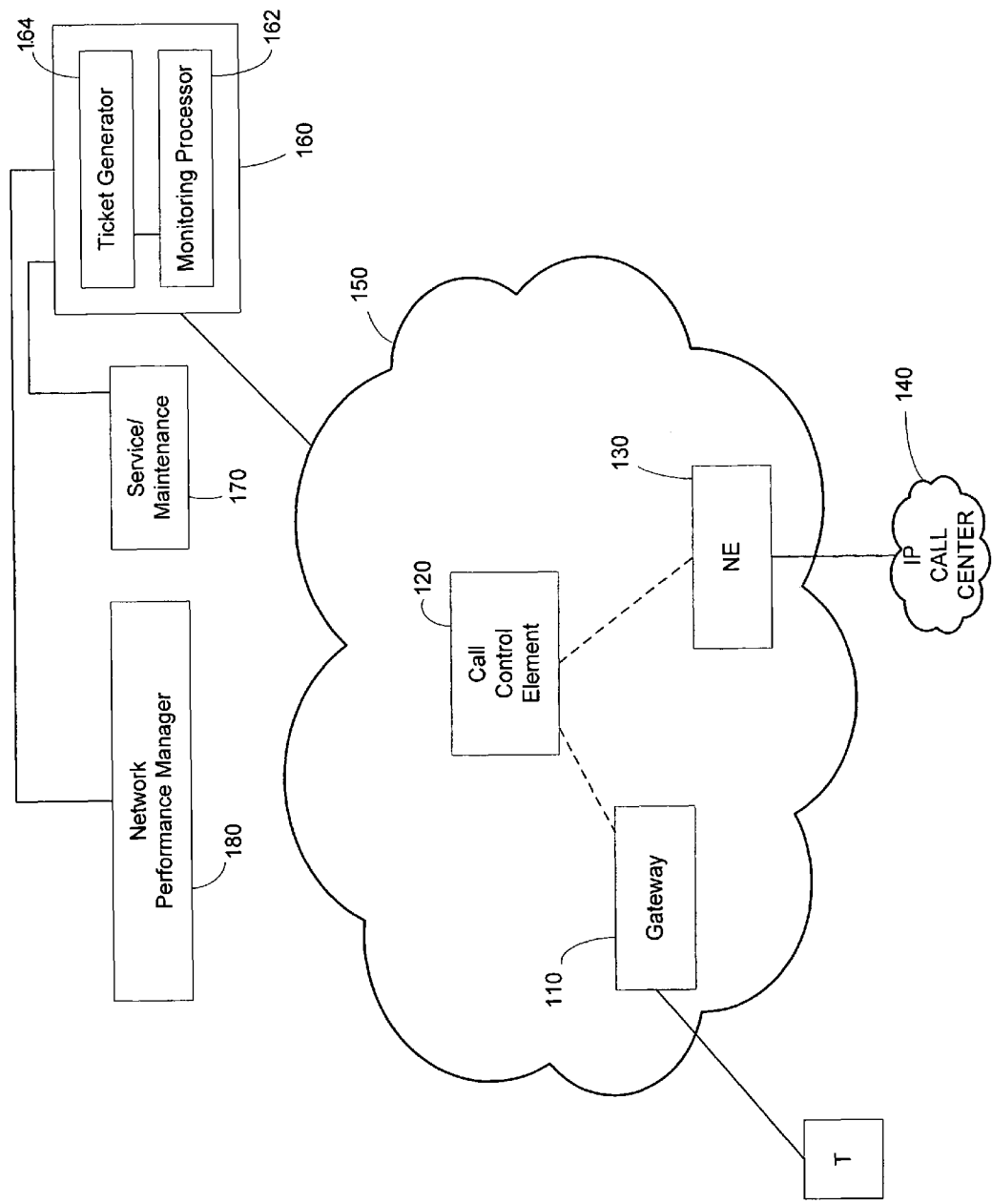
FIG. 1 illustrates an embodiment of an arrangement in which the invention can be performed.

In an arrangement such as FIG. 1, a telephony instrument T initiates a call or session in contacting the gateway 110 while control element 120 is responsible for routing decisions within the network 150. In accordance with the routing tables and rules of the call control element 120, the gateway 110 is coupled to the network element 130 to thereby provide access for the telephony instrument T through to the IP call center 140. During call set-up, Internet protocol signaling messages such as SIP or H.323 messages, pass through the respective network nodes and information is passed to a monitoring operation such as that shown as element 160 in FIG. 1. The monitoring system can include a monitoring processor 162 and a ticket generator 164. In this present arrangement, the monitoring system 160 can passively monitor and log call set-up message transactions related to call set-ups in the network 150. The monitoring processor can then take the log information to calculate a total post-dial delay associated with a given call set-up process as well as a contribution to the total post-dial delay by each node and/or pseudo trunk which creates the call path between, for instance the telephony instrument T and the IP call center 140.

The monitoring process then executes an analysis utilizing a rules based processing engine to determine whether the total post-dial delay exceeds a defined threshold and/or whether the total post-dial delay exceeds a defined threshold and/or whether a contribution to the post-dial delay from any one of the nodes or links exceeds an acceptable threshold level. If either or both of those events occur, the monitoring process can trigger a ticket generator to generate an indication of the existence of an alert event or an alarm event whereby a network performance manager and/or a service maintenance organization can be notified about the existence of this potential service problem within the VoIP network.

The rules based processing engine might generate the alarm upon the occurrence of the excessive post-dial delay or, the rules based processing engine may elect to use that event as a trigger to perform further, more specific monitoring and/or analysis with regard to post-dial delay metrics or other metrics associated with the node(s) and or link(s) giving rise to that particular occurrence. That is, the occurrence of the anomalous post-dial delay might be taken as a reason for further analysis of elements within the system to either check historical information related to those elements or to monitor more closely those elements with regard to either post-dial delay or some other quality of service metric available through the signaling process so as to further detect whether some maintenance issue has arisen with regard to one or more elements within the VoIP network.

Figure 2:
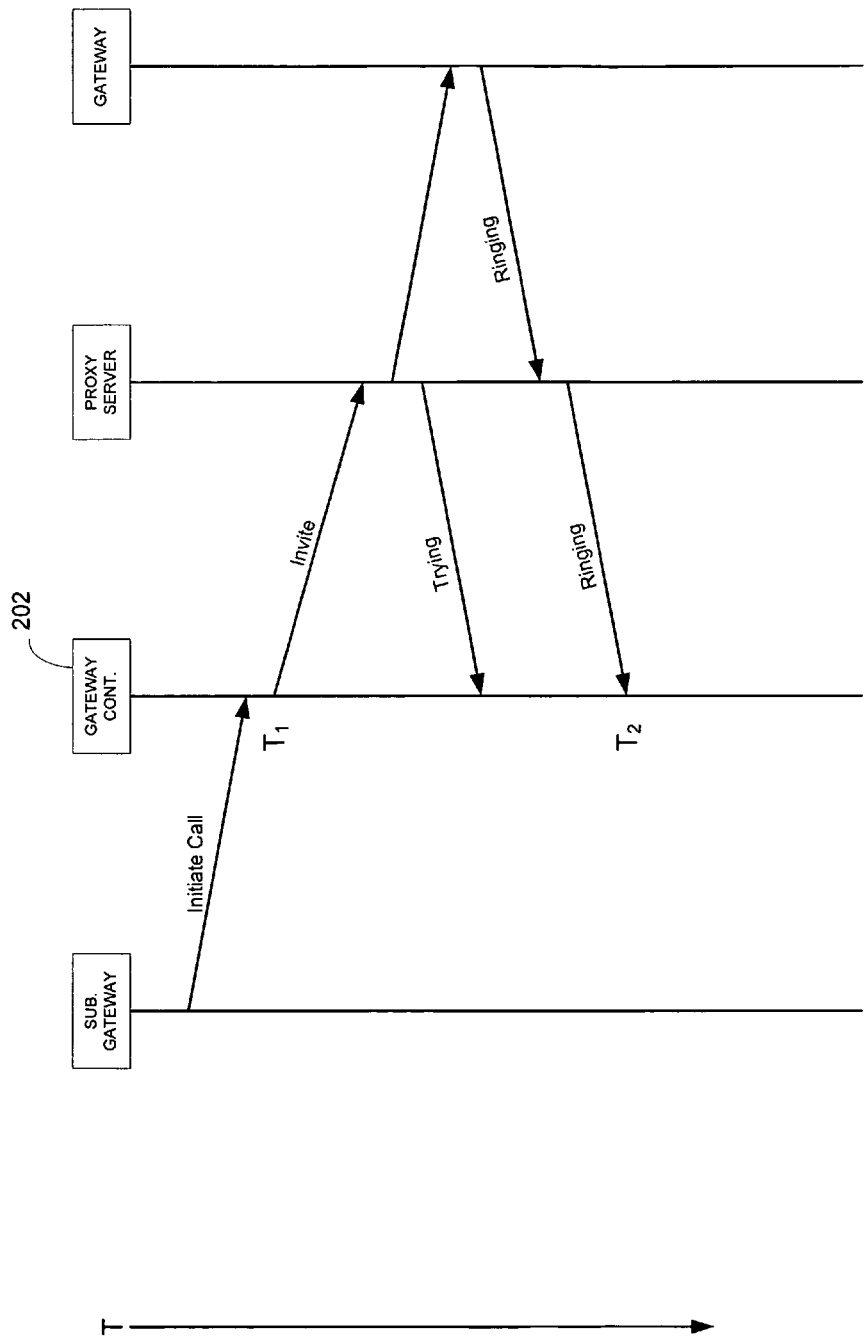
FIG. 2 illustrates a sample time line of a call set-up process that could be monitored in accordance with an embodiment of the invention.

FIG. 2 is a timeline usable as a reference for understanding how time elapses from the initiation of a call making reference to a sub-gateway element within the network through to another gateway element which establishes the connection to a destination device. It can be seen that with regard to gateway element 202 the time from $T_1$ to $T_2$ is an elapsed time indicative of a post-dial delay related to that particular element in the VoIP configuration. The present invention utilizes its monitoring capabilities to analyze the contribution of each of the elements to the post-dial delay and can select as between the elements those elements which provide excessive contributions to the post-dial delay, whether those elements are links such as pseudo trunks or nodes.

Figure 3:
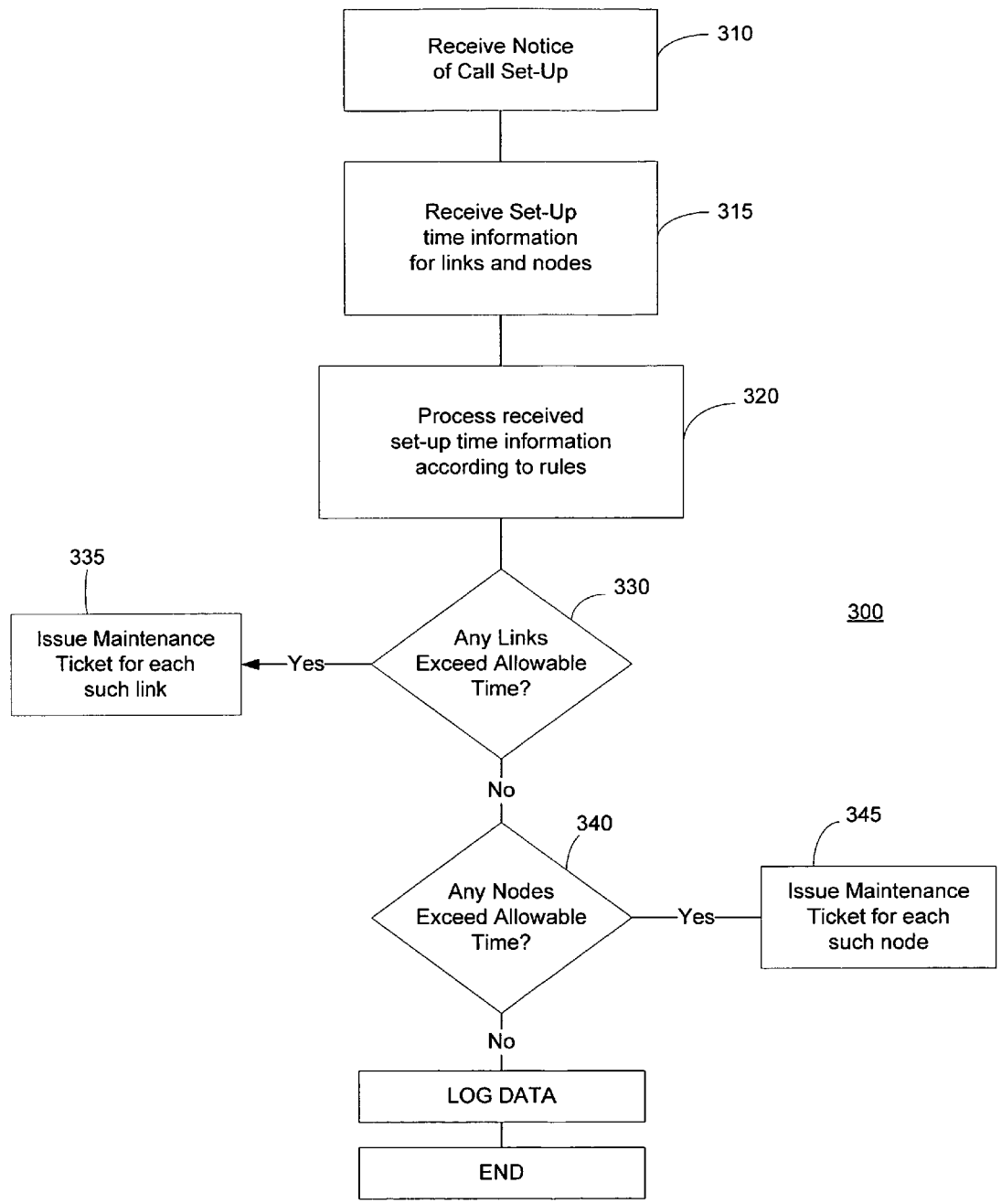
FIG. 3 illustrates a process flow diagram for describing an embodiment of the invention.

FIG. 3 is a process flow diagram useful for describing an operation with regard to the monitoring process utilized in connection with the present invention.

In this process 300, a monitoring system receives notice of a call set-up in connection with the typical IP signaling that is done in a call processing mode. As described above, this can be received as the monitor operates in a passive mode.

Additionally, the monitoring operation receives set-up time information for various links and nodes in the call set-up operation (315). The monitoring processor can then process the received set-up time information according to a rules based processing engine to ascertain whether the post-dial delay as a total time or the contributions of any one of the nodes or links within the arrangement exceed an acceptable limit (320). For example, as a subpart of the process utilizing the rules, the system can determine whether any of the links such as pseudo trunks within the VoIP call exceed any allowable time (330). And if so, then the monitoring process can trigger a ticket generator to issue a maintenance ticket for each such link (335). If no links exceed allowable time, the system can still assess whether any of the nodes involved in the call set-up process exceed an allowable time (340). If yes, then the ticket generator can issue a maintenance ticket with regard to each such node that exceeds the allowable time (345). If no nodes exceed the allowable time and the post-dial delay total is acceptable, then the system can simply log the data with regard to the call set-up information received and end the processing operation with regard to monitoring for potential failures based on call set-up metric information.

One of ordinary skill in the art would recognize that while the applicants have referred to the use of the post-dial delay metric associated with the call set-up, other metrics might be explored for use in connection with determining whether there is an indication in the call set-up process that a failure has occurred or is likely to occur and would require maintenance.

In addition one of ordinary skill in the art would understand that the plurality of modules 160, 170 and 180 (namely the monitoring system, the service/maintenance module and the network performance manager) while illustrated as separate modules could be implemented in an integrated fashion. All of these modules require certain processing capabilities associated with them and are likely to operate in a more effective manner by way of having specifically crafted program control for those processors where the program controls are designed to specifically effect functions related to either monitoring service or network management. However, it is possible that these systems could be run off of an integrated processing platform with appropriately determined software modules for operating all the necessary functionality to effect the appropriate efficient monitoring and control of the VoIP network, particularly as it relates to assessing whether predictive maintenance is called for given certain call set-up characteristics.

CONCLUSION

While various embodiments of the invention have been described above, it should be understood that they have been presented by way of example only, and not limitation. For example although the above methods are shown and described above as a series of operations occurring in a particular order, in some embodiments, certain operations can be completed in a parallel fashion. In other embodiments, the operations can be completed in an order that is different from that shown and described above.

What is claimed is:

1. A method comprising:
   receiving an indication of an initiation of a call set-up process;
   monitoring, during said call set up process, call set up data related to each one of a plurality of nodes and a plurality of links associated with the call set-up process;
   analyzing, via a processor, during said call set-up process said call set up data related to the each one of the plurality of nodes and the plurality of links associated with the call set-up process using a processor-driven rules based engine to determine if any one or more of the plurality of links or plurality of nodes has exceeded a predetermined time threshold for setting up the call; and
   issuing a maintenance request for a link or a node determined to have exceeded said predetermined threshold.

2. The method of claim 1 wherein said call set up data relates to post dial delay information.

3. The method of claim 1 wherein said call set-up process arises in connection with a voice over internet protocol (VoIP) arrangement.

4. The method of claim 3 wherein said call set up data relates to a post dial delay (PDD) information.

5. The method of claim 4 further comprising generating a report including an identification of a contribution to the PDD by at least two nodes.

6. The method of claim 5 wherein the report includes an identification of a contribution to the PDD by at least two links.

7. A method comprising:
   monitoring signaling on voice over Internet Protocol communications arrangement;
   observing an initiation of a call set-up process;
   monitoring, during said call set up process, call set-up data related to each of a plurality of nodes associated with the call set up process;
   determining a contribution of each of the plurality of nodes to a post dial delay characteristic of the call set-up process based upon said call set-up data related to each of the plurality of nodes associated with the call set-up process;
   assessing, via a processor, during said call set-up process whether any one or more of the plurality of nodes has an associated contribution to the post dial delay characteristics that satisfies a predetermined criterion; and
   designating for maintenance a node that satisfies said predetermined criterion.

8. The method of claim 7 wherein the designating includes generating an alarm.

9. The method of claim 7 wherein the monitoring includes monitoring Session Initiated Protocol (SIP) and H.323 signaling.

10. The method of claim 7 further comprising receiving call set up data related to each of a plurality of links associated with the call set-up process;
   determining a contribution of each of the plurality of links to a post dial delay characteristic of the call set-up process;
   assessing whether any of the plurality of links has an associated contribution that satisfies a second predetermined criterion; and
   designating for maintenance a link that satisfies said second predetermined criterion.

11. The method of claim 10 wherein said first predetermined criterion comprises a first elapsed time threshold and said second predetermined criterion comprises a second elapsed time threshold.

12. The method of claim 10 wherein said assessing and said designating processes are performed with reference to a processor driven rules based engine.

\* \* \* \* \*